(12) United States Patent
Gochis (10) Patent No.: US 11,953,237 B2
(45) Date of Patent: Apr. 9, 2024

(54) PILES PROVIDING SUPPORT AND GEOTHERMAL HEAT EXCHANGE

(71) Applicant: Bernard J. Gochis, Westminster, CO (US)

(72) Inventor: Bernard J. Gochis, Westminster, CO (US)

(*) Notice: Subject to any disclaimer, the term of this patent is extended or adjusted under 35 U.S.C. 154(b) by 327 days.

(21) Appl. No.: 17/401,148

(22) Filed: Aug. 12, 2021

(65) Prior Publication Data

US 2023/0047310 A1 Feb. 16, 2023

(51) Int. Cl.
*F24T 10/17* (2018.01)
*E02D 5/56* (2006.01)
*F24T 10/00* (2018.01)

(52) U.S. Cl.
CPC ............ *F24T 10/17* (2018.05); *E02D 5/56* (2013.01); *F24T 2010/53* (2018.05); *F25B 2313/002* (2013.01)

(58) Field of Classification Search
CPC . F24T 10/10; F24T 10/13; F24T 10/17; F24T 2010/53; F24T 2010/50; E02D 5/56; F25B 2313/002; F03G 4/029; F03G 4/063
See application file for complete search history.

(56) References Cited

U.S. PATENT DOCUMENTS

| | | | |
|---|---|---|---|
| 4,325,228 | A | 4/1982 | Wolf |
| 4,574,875 | A | 3/1986 | Rawlings et al. |
| 5,339,890 | A | 8/1994 | Rawlings |
| 5,561,985 | A * | 10/1996 | Cochran ............. F24T 10/15 165/45 |
| 8,262,322 | B2 | 9/2012 | Desmeules |
| 8,821,074 | B2 | 9/2014 | Reid et al. |
| 8,875,778 | B2 | 11/2014 | Marois |
| 9,611,611 | B2 | 4/2017 | Klekotka et al. |
| 2003/0221870 | A1 | 12/2003 | Johnson, Jr. |

(Continued)

FOREIGN PATENT DOCUMENTS

| | | |
|---|---|---|
| CA | 2 691 363 | 1/2009 |
| EP | 1 243 875 A1 | 9/2002 |

(Continued)

OTHER PUBLICATIONS

JP-2006029623-A translation Date: Feb. 2006.*

(Continued)

*Primary Examiner* — Shafiq Mian
(74) *Attorney, Agent, or Firm* — James A. Sheridan; Sheridan Law, LLC (57) ABSTRACT

There is disclosed a foundation system for providing support to a structural load thereon and geothermal heat exchange using a fluid. In an embodiment, the foundation system includes at least one vertical pile member configured to install into a ground surface. A central insulated tube extends in a longitudinal direction within the vertical pile member. The central insulated tube is configured to transmit a geothermal heat exchange fluid therein. An input pipe and an output pipe are configured to transmit the geothermal heat exchange fluid through the vertical pile member and extend through the sidewall of the vertical pile member. A closed end, provided at the end of the pile member is configured to provide densified soil to increase heat transfer capability and efficiency in combination with the heat exchange limited by the central insulated tube. Other embodiments are also disclosed.

22 Claims, 6 Drawing Sheets

(56) References Cited

U.S. PATENT DOCUMENTS

| | | | |
|---|---|---|---|
| 2005/0061472 A1* | 3/2005 | Guynn | F24T 10/15 |
| | | | 165/104.11 |
| 2008/0169084 A1 | 7/2008 | Bullivant | |
| 2009/0025902 A1* | 1/2009 | Favier | F24T 10/17 |
| | | | 165/104.19 |
| 2009/0110489 A1 | 4/2009 | Armstrong | |
| 2009/0250200 A1 | 10/2009 | Kidwell et al. | |
| 2010/0040419 A1 | 2/2010 | Roussy | |
| 2010/0200192 A1* | 8/2010 | Consigny | F24T 10/17 |
| | | | 165/45 |
| 2012/0118529 A1* | 5/2012 | Marois | F24T 10/15 |
| | | | 165/45 |
| 2013/0004244 A1* | 1/2013 | Reid | F24T 10/17 |
| | | | 405/252.1 |
| 2013/0272798 A1 | 10/2013 | Paul | |
| 2014/0110082 A1* | 4/2014 | Suver | F24T 10/17 |
| | | | 165/45 |
| 2021/0002843 A1 | 1/2021 | Kemp | |
| 2021/0048229 A1* | 2/2021 | Niemi | F24T 10/15 |

FOREIGN PATENT DOCUMENTS

| | | | | |
|---|---|---|---|---|
| EP | 2 247 816 B1 | 12/2016 | | |
| GB | 2 442 803 A | 4/2008 | | |
| JP | 2004233031 A * | 8/2004 | | F24J 3/084 |
| JP | 2005069538 A * | 3/2005 | | F24T 10/13 |
| JP | 2006029623 A * | 2/2006 | | F24T 10/10 |
| JP | 2007271178 A * | 10/2007 | | F24J 3/084 |
| JP | 2015-151837 A | 8/2015 | | |
| WO | 80/02736 A1 | 12/1980 | | |
| WO | 2006/111655 A1 | 10/2006 | | |
| WO | 2008/009289 A1 | 1/2008 | | |
| WO | 2020/039123 A1 | 2/2020 | | |

OTHER PUBLICATIONS

JP-2005069538-A translation Date: Mar. 2005.*
JP-2004233031-A translation Date: Aug. 2004.*
JP-2007271178-A translation Date: Oct. 2007.*

* cited by examiner

PILES PROVIDING SUPPORT AND GEOTHERMAL HEAT EXCHANGE

BACKGROUND

Conventional systems for selectively heating or cooling a particular medium, commonly cooling and heating buildings and building spaces, require energy from limited sources and which consequently is increasingly more expensive. Much attention has been given, particularly in recent times, to sources of energy which exist as natural phenomena. Such energy includes solar energy, geothermal energy, tidal energy and wind-generated energy. While all of these energy sources have advantages and disadvantages, the geothermal energy appears to be reliable, readily available and easily tapped.

Systems to provide geothermal cooling or heating may employ coils, tanks or other liquid containers buried in the earth at depths ranging from open containers extending downwardly from the surface to a depth of several feet to coils or closed tanks buried several feet beneath the surface of the earth. These systems have suffered from many deficiencies and have not been effective in tapping this virtually inexhaustible cooling and heating source. For example, these systems rely exclusively on the earth immediately surrounding the liquid containers and the heat that can migrate thereinto. Such coils, tanks, containers and the like are usually constructed of plastic or other materials which are not efficient thermal conductors and have other inefficiencies inherent or incorporated therein.

Temperature of the ground increases as function of depth from the ground surface. Geothermal cooling or heating is based on transferring or extracting heat from a certain depth of the ground by utilizing a ground hole extending into the ground and releasing the heat in a heat pump to be used in the buildings or building spaces. The geothermal heating is usually carried out using a geothermal heat exchanger having a piping arrangement arranged into the ground hole. Working fluid is circulated in the piping arrangement such that the working fluid flows into the ground hole in which it releases or receives heat energy into or from the ground. The working fluid further flows back to the ground surface with less or more heat energy (depending on cooling or heating desires). Then the working fluid absorbs or releases heat energy in the heat pump to heat pump working fluid and flows again into the ground hole for transferring or extracting heat. The heat pump further captures or releases the heat energy to the building or the building space for cooling or heating.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an embodiment, there is provided a foundation system for providing support to a structural load thereon, and the foundation system for providing geothermal heat exchange using a fluid, the foundation system comprising at least one vertical pile member, the vertical pile member having a first end and a second end in opposition to one another, the first end configured to install in a distal location from a ground surface into a ground soil environment, the second end configured to install proximal to the ground surface, and a sidewall extending between the first end and the second end; a central insulated tube extending in a longitudinal direction within the vertical pile member, the central insulated tube having a first opening and a second opening, the first opening configured adjacent the first end, the second opening configured adjacent the second end, and the central insulated tube configured to transmit a geothermal heat exchange fluid therein, the central insulated tube configured to limit heat exchange of the geothermal heat exchange fluid to the sidewall of the vertical pile member and prevent heat exchange from the geothermal heat exchange fluid between the first opening and the second opening to heat exchange fluid adjacent the second end of the vertical pile member; an input pipe and an output pipe configured to transmit the geothermal heat exchange fluid through the vertical pile member, each of the input pipe and the output pipe configured to extend through the sidewall of the vertical pile member; and a cap plate configured to engage the vertical pile member at the second end thereof, and the cap plate configured to support a structural load thereon.

In another embodiment, there is provided a vertical pile for providing support, and the vertical pile for providing geothermal heat exchange, the vertical pile comprising: a first end and a second end in opposition to one another, the first end configured to install in a distal location from a ground surface into a ground soil environment, the second end configured to install proximal to the ground surface, and a sidewall extending between the first end and the second end; a central insulated tube extending in a longitudinal direction within the vertical pile member, the central insulated tube having a first opening and a second opening, the first opening configured adjacent the first end, the second opening configured adjacent the second end, and the central insulated tube configured to transmit a geothermal heat exchange fluid therein, the central insulated tube configured to limit heat exchange of the geothermal heat exchange fluid to the sidewall of the vertical pile member and prevent heat exchange from the geothermal heat exchange fluid between the first opening and the second opening to heat exchange fluid adjacent the second end of the vertical pile member; an input pipe and an output pipe configured to transmit the geothermal heat exchange fluid through the vertical pile member; and a cap plate configured to directly engage the vertical pile member at the second end thereof, and the cap plate configured to directly support a structural load thereon.

Other embodiments are also disclosed.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which.

DETAILED DESCRIPTION

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Foundation systems may be provided to both support a structural load thereon and to facilitate geothermal heat exchange using a fluid. In an embodiment, and with reference to FIG. 1, a foundation system includes at least one vertical pile member 10. Vertical pile member 10 may have a first end 15 and a second end 20 in opposition to one another. First end 15 may be configured to install in a distal location from a ground surface into a ground soil environment. Second end 20 may be configured to install proximal to the ground surface. A sidewall 25 may extend between first end 15 and second end 20.

Figure 1:
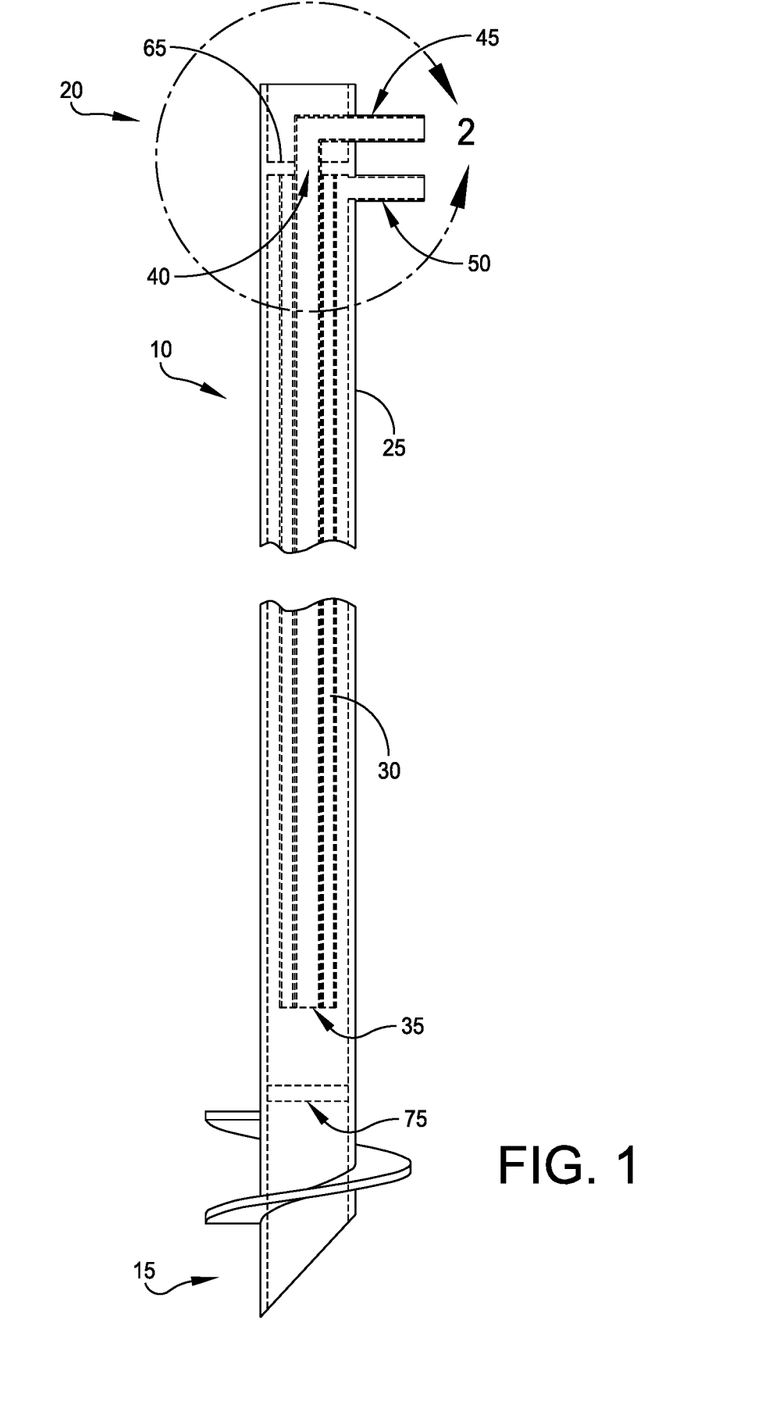
FIG. 1 illustrates a pile having a geothermal fluid exchange pathway with a central insulated tube using a sidewall configured to both provide heat exchange between the fluid and the ground as well as provide structural support to a structural load on the pile.
Figure 2:
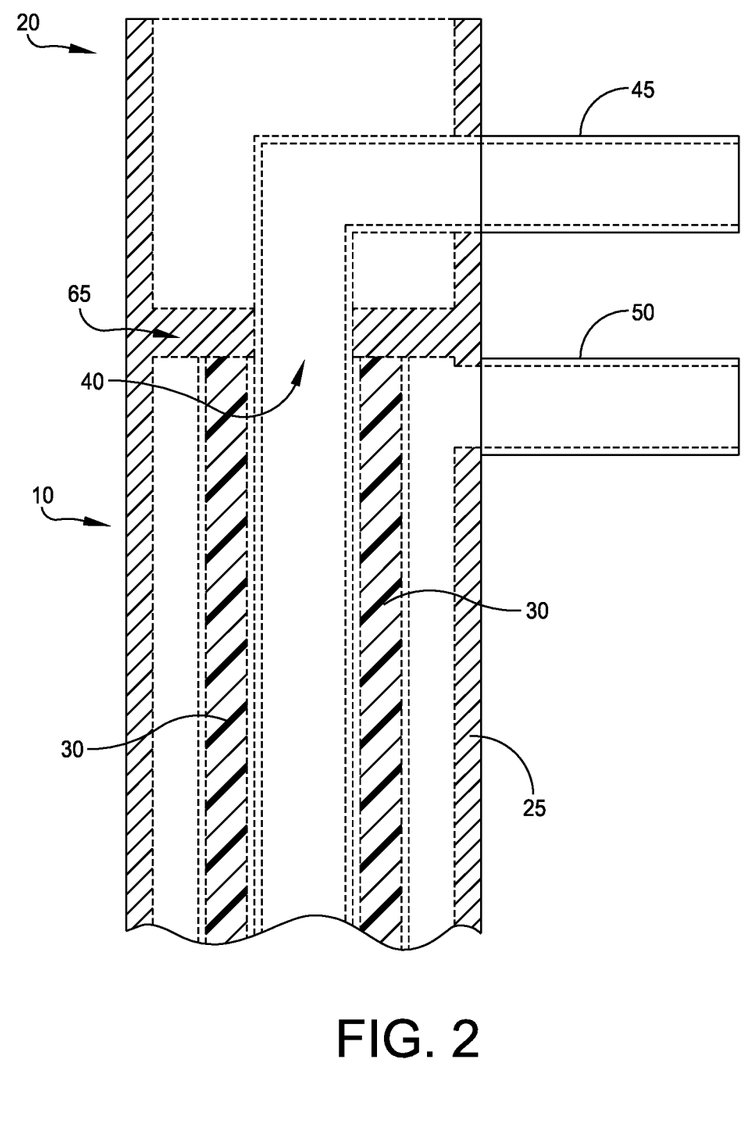
FIG. 2 illustrates an enlarged portion of the pile of FIG. 1.
Figure 3:
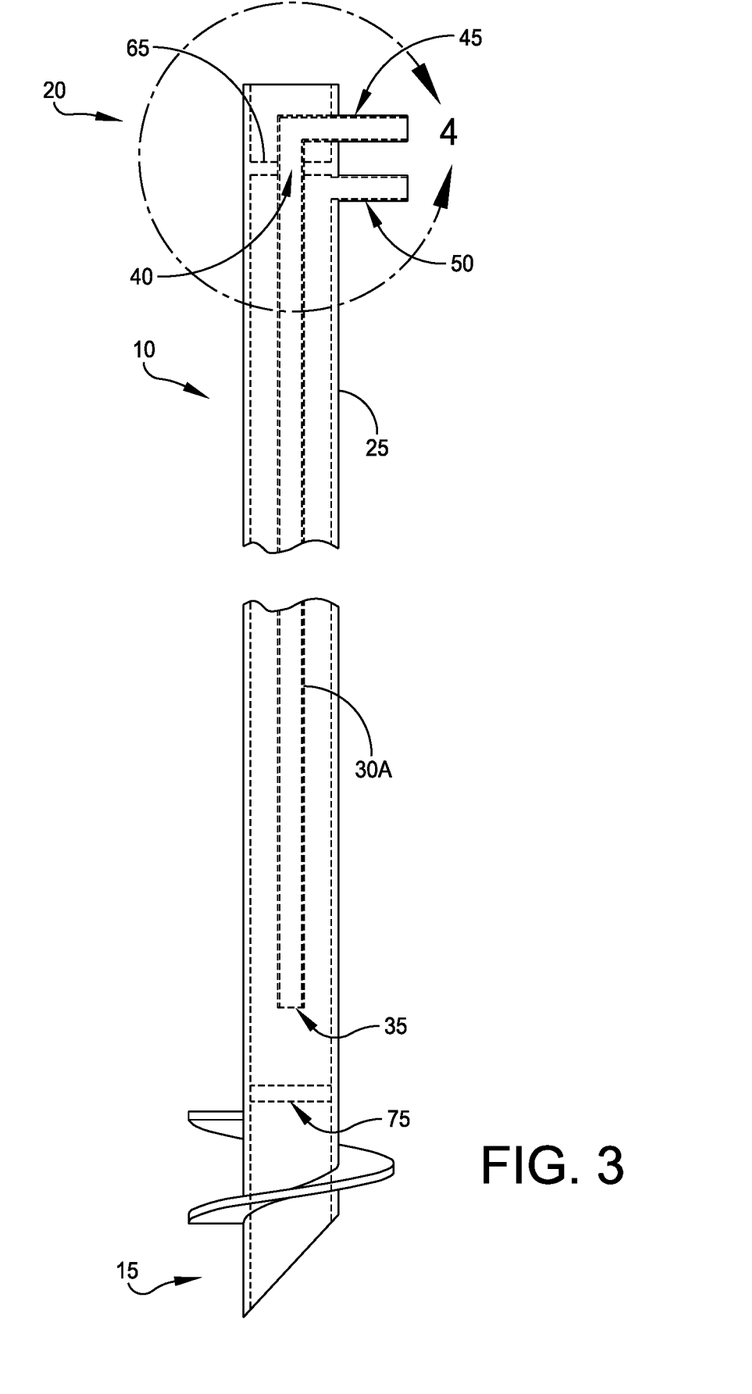
FIG. 3 illustrates a pile having a geothermal fluid exchange pathway with a central uninsulated tube using a sidewall configured to both provide heat exchange between the fluid and the ground as well as provide structural support to a structural load on the pile.
Figure 4:
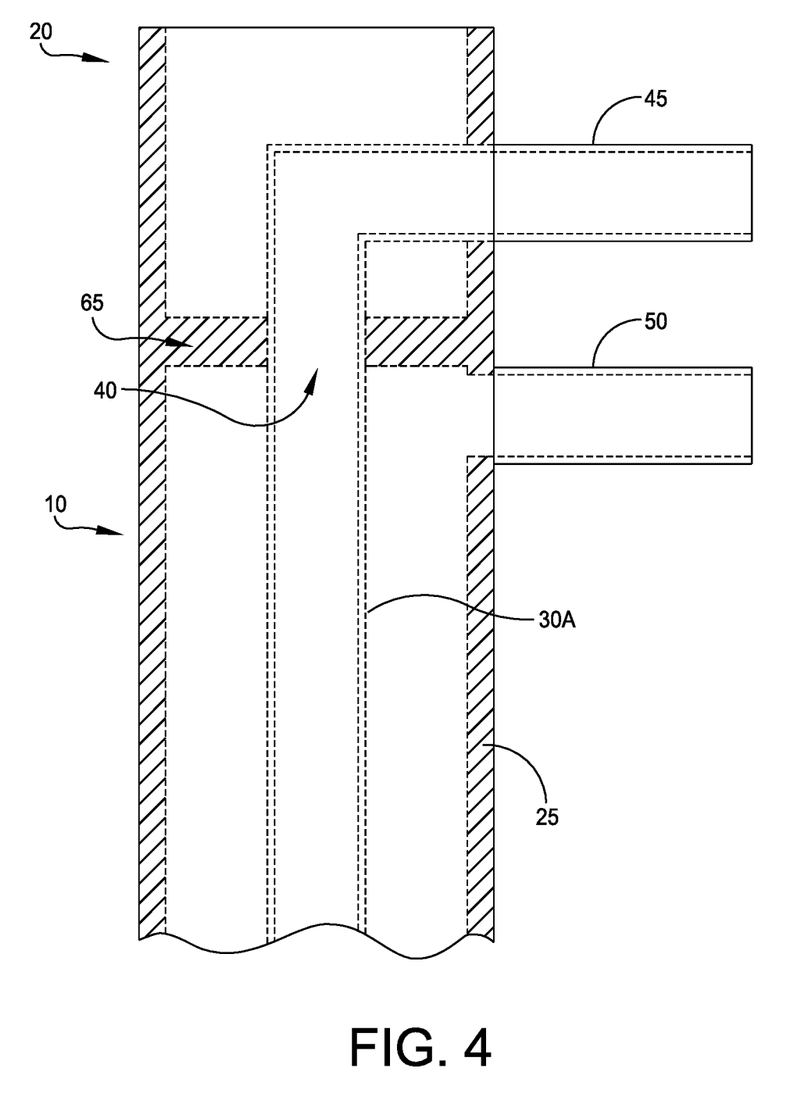
FIG. 4 illustrates an enlarged portion of the pile of FIG. 3.

A central insulated tube 30 may extend in a longitudinal direction within vertical pile member 10. Central insulated tube 30 may include a first opening 35 and a second opening 40. First opening 35 is configured adjacent first end 15. Second opening 40 is configured adjacent second end 20.

Central insulated tube 30 may be configured to transmit a geothermal heat exchange fluid therein. Central insulated tube 30 may be configured to limit heat exchange of the geothermal heat exchange fluid to sidewall 25 (of vertical pile member 10) and prevent heat exchange from the geothermal heat exchange fluid between first opening 35 and second opening 40 to heat exchange fluid adjacent the second end 20 of the vertical pile member 10.

Still referring to FIG. 1, there is shown an input pipe 45 and an output pipe 50 configured to transmit the geothermal heat exchange fluid through vertical pile member 10. Input pipe 45 and output pipe 50 may be configured to extend through sidewall 25 of vertical pile member 10.

Figure 5:
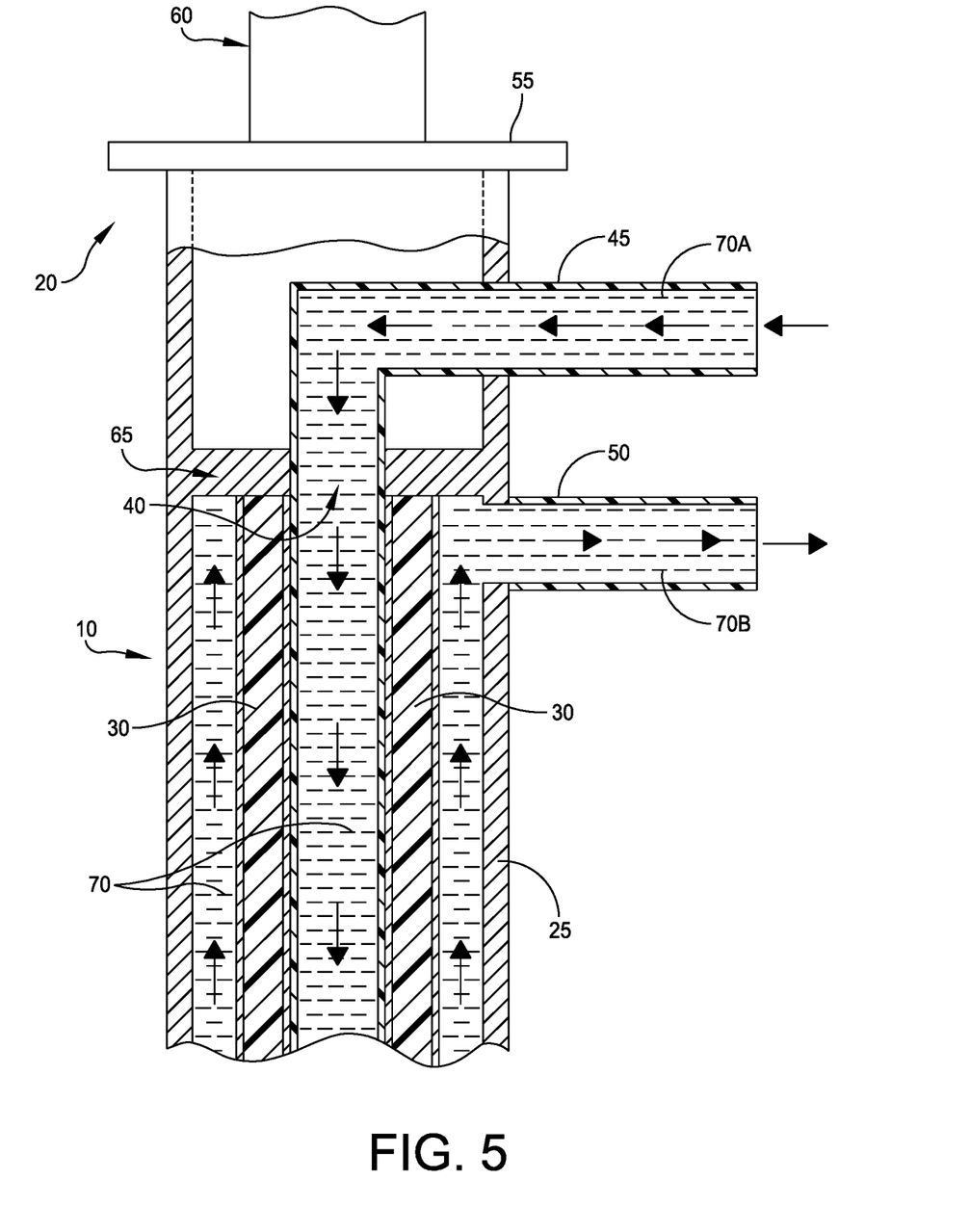
FIG. 5 illustrates a schematic view of a portion of a pile having a central insulated tube having heat exchange fluid flowing therethrough.

With reference to FIG. 5 cap plate 55 may be configured to engage vertical pile member 10 at second end 20. Cap plate 55 may be configured to support a structural load 60 thereon.

This configuration of pipes 45, 50 through sidewall 25 allows efficient placement of pile 10 into the ground with the ability to efficiently locate cap plate 55 in support of the sidewall 25.

In various embodiments, second end 20 may be configured to install above the ground surface of a ground soil environment. Second end 20 may be configured to install adjacent the ground surface of the ground soil environment. Second end 20 may be configured to install below the ground surface of the ground soil environment.

Cap plate 55 may directly attach to each of sidewall 25 and the structural load supported thereon. Structural load 60 may include a platform carrying machinery. Structural load may include a building. Structural load 60 may include a thermal mass operably engaged with vertical pile member 10 for geothermal heat exchange from the ground soil environment to regulate temperature thereof. Simultaneously, structural load 60 receives support from vertical pile member 10 relative to the ground surface.

In various embodiments, central insulted tube 30 may extend from a sealed portion 65 adjacent second end 20 of vertical pile member 10. First opening 35 of central insulated tube 30 may be configured distal of sealed portion 65 and toward first end 15 of vertical pile member 10. Second opening 40 of central insulated tube 30 may be configured to communicate at a location proximal to sealed portion 65.

Input pipe 45 may be configured for fluid communication of the geothermal heat exchange fluid into first opening of central insulated tube 30. Output pipe 50 may be configured for fluid communication of the geothermal heat exchange fluid from between sidewall 25 and central insulated tube 30 adjacent first end 15 of vertical pile member 10. In various embodiments, each of input pipe 45 and output pipe 50 are configured to extend through sidewall 25 of vertical pile member 10 at a location distal from cap plate 55. This configuration of the input pipe 45 and output pipe 50 extending through sidewall 25 allows pile 10 to provide support to structural load 60 without requiring adaptors or other efforts to reconfigure pipes 45, 50 to remain clear of the elements supporting structural load 60 in connection with the pile 10. In various embodiments, this configuration allows second end 20 of sidewall 25 and cap plate 55 to directly support structural load 60.

In various embodiments, sidewall 25 has a thickness configured to support a given structural load and transmit heat through the thickness. The sidewall in other designs is typically provided as a thin wall, not capable of carrying a significant structural load, but rather optimized for heat flow through the sidewall. However, vertical pile member 10 is engineered with a thickness of sidewall 25 to allow rigidity for installation into the ground, adequate structural support for a given load, and adequate bi-directional heat transfer for geothermal heating or cooling.

In an embodiment, sidewall 25 may be configured to transmit heat from a warmer one of the geothermal heat exchange fluid and the ground soil environment to a colder one of the geothermal heat exchange fluid and the ground soil environment. For example, when geothermal heat exchange fluid is the warmer one, sidewall 25 will transmit heat from the geothermal heat exchange fluid into the ground soil environment. Central insulated tube 30 may be configured to prevent heat therein (adjacent second end 20) from directly transmitting into the geothermal heat exchange fluid at a location between sidewall 25 and central insulated tube 30 at second end 20.

In various embodiments, structural load 60 operably incudes a geothermal heat exchanger configured to transmit heat from at least a portion associated with structural load 60 into the geothermal heat exchange fluid (which in turn is circulated through the loop of pile 10).

In another embodiment, when the geothermal heat exchange fluid is the colder one, sidewall 25 will transmit heat from the ground soil environment into the geothermal heat exchange fluid (which in turn is circulated from the loop of pile 10 and then into the heat exchanger associated with structural load 60). Central insulated tube 30 may be configured to prevent heat from directly transmitting into the geothermal heat exchange fluid therein (adjacent second end 20) from the geothermal heat exchange fluid between the sidewall and the central insulated tube at the second end. Structural load 60 may operably include a geothermal heat exchanger configured to transmit heat from the geothermal heat exchange fluid into a portion associated with structural load 60.

In one embodiment, a plurality may be provided of the vertical pile members 10. The plurality of piles 10 may be configured to support structural load 60. The plurality of piles 10 may be configured to provide geothermal heat exchange into the ground environment.

Figure 6:
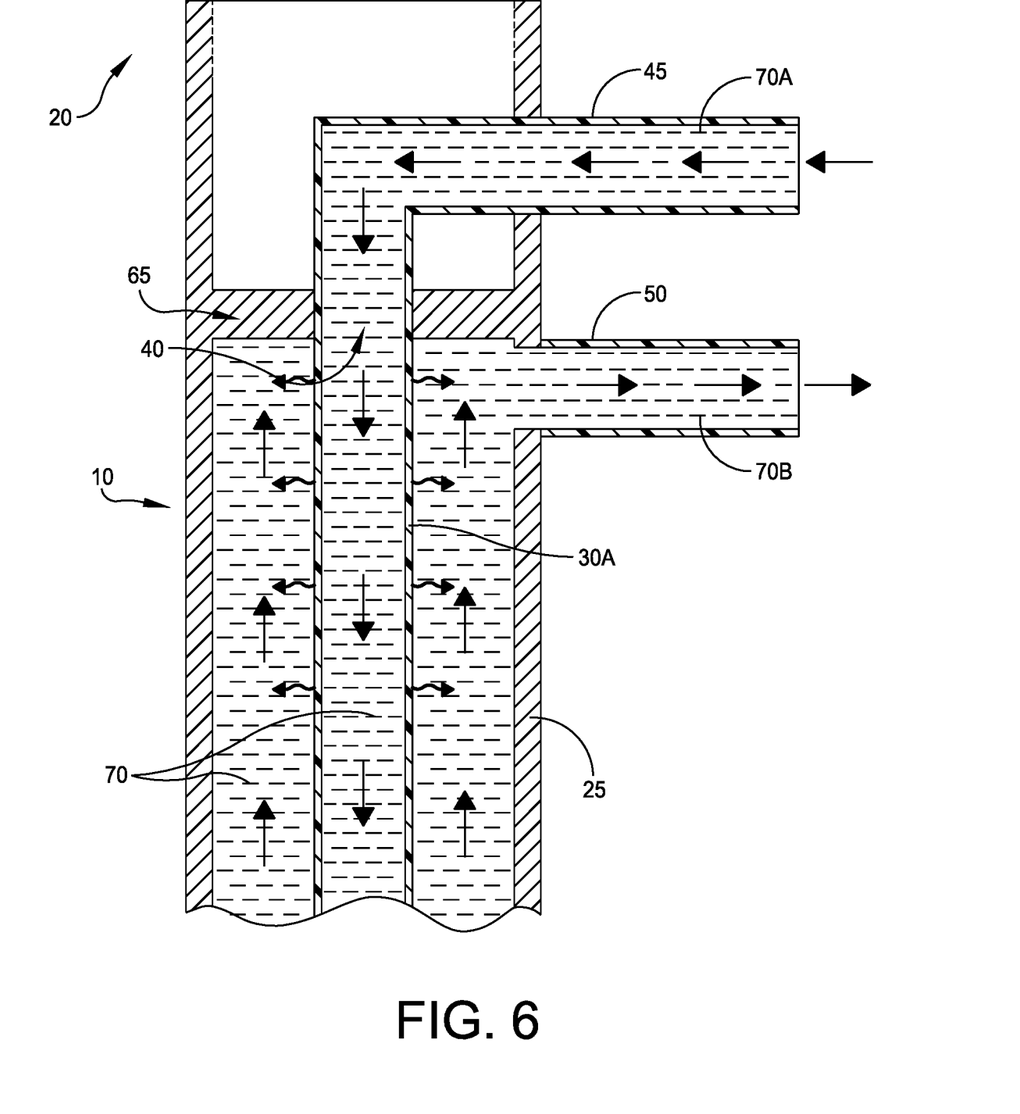
FIG. 6 illustrates a schematic view of a portion of a pile having a central uninsulated tube having heat exchange fluid flowing therethrough, with a thermal shunt illustrated with heat flow occurring relatively near the input tube and output tube.

With reference to FIGS. 5 and 6, there is illustrated heat exchange fluid 70 flowing through vertical pile members 10. In FIG. 5, there is provided a central insulated tube 30 (which may be referred to as an insulated shell drop tube.) Central insulated tube 30 may include many materials, and may include, but is not limited to, a dual-wall, vacuum sealed tube. This tube may be formed of aluminum in a similar matter to a dual-wall aluminum water bottle. FIG. 5 illustrates the flow of hot fluid 70A flowing through the input pipe 45 and the flow of cool fluid 70B flowing out of output pipe 50. Central insulated tube 30 prevents heat flow from hot fluid 70A into cool fluid 70B adjacent second end 20 of pile 10.

FIG. 6 illustrates flow of hot fluid 45 through a central uninsulated tube 30A in which heat is allowed to flow from hot fluid 70A into cool fluid 70B adjacent second end 20 of pile 10. This is referred to as a thermal shunt and occurs when there is a thermal transfer between the down-going fluid and the up-going fluid. It decreases the system efficiency. To limit this effect, the material of the central pipe may be selected to have a higher thermal resistance.

In various embodiments, vertical pile 10 provides both structural support and geothermal heat exchange. Sidewall should be relatively thick to provide adequate structural support in contrast to applications that call for a thin walled pipe to provide arguably optimal heat exchange between the ground and the fluid. The synergy between the load bearing capability of the pile and the heat exchange features of the pile provide an economical system for providing both structural support and geothermal heat transfer.

In at least one embodiment, at least one pile 10 does not carry a structural load. In some embodiments, none of piles 10 will carry a structural load. However, pile 10 with a thick-wall will still provide the benefit of enhanced heat transfer with soil densification coupled together with central insulated tube 30 to regulate the heat transfer with a flow rate of fluid through the pile 10.

In various embodiments, pile 10 may be implemented in a custom design build. This custom design build may include various load tests. One is a heat load test. This may be performed at a site prior to design and installation of many piles 10. For example, a mobile load testing unit, which may be provided on a trailer, may be used to run a pre-install heat load test at one or more piles 10. In another embodiment, the mobile load testing unit may be implemented in a post-install test. Heat load test may be provided first, prior to design of system, or may be provided second, as a confirmation of the heat transfer of the system as actually designed. This testing may be in addition to, or without requiring, a structural load test with respect to the particular soil at the install site. While general soil information may be used for design purposes, the site-specific testing allows more precise design and build, with appropriate tolerances, so as to more cost effectively design and build a system with piles 10. Accordingly, this testing may take full advantage of efficiencies of soil densification, with quick install procedures, by testing heat transfer with respect to soil at install site. These tests prior to install of entire system allow calculations for design with respect to length and number of piles 10. This allows a targeted safety factor rather than over-installing a number of piles for one or both of heat load characteristics and structural load characteristics.

In various embodiments, piles 10 may be closed at first end 15. This closed end may provide a plugged bottom or other soil engaging surface to aid in soil densification. In numerous embodiments, piles 10 may be installed into undisturbed soil to provide compacting and densifying of the soil surrounding the pile. This greatly aids in the heat transfer capability and thermal connectivity of the soil in contact to first creating a borehole and then installing a tube, conduit, or pile. For a thin-walled structure, a pre-formed hole would almost always be required prior to installing the pipe or other structure. Some installations require or generally call for grout material installation to provide a better heat transfer media adjacent to the pile, which is not required or desired using the piles as disclosed herein. The piles of the various embodiments modify and densify the adjacent soil and do not require additional working steps prior to install or after install. In various embodiments, first end 15 formed with a closed end, which is illustrated with lower bearing plate 75. First end 15 20 may include an angle relative to the longitudinal axis. The angle may be 45 degrees, or another angle providing a desired pitch, to compact and shovel soil as closed first end 15 with lower bearing plate 75 of pile 10 is driven into the ground. It should be appreciated that plate 75 may provide the dual purpose of a soil bearing plate to compact soil as pile 10 is driven into the ground, and to seal the interior of the pile 10 so as to prevent fluid 70 from leaking into the surrounding soil. In other embodiments, lower bearing plate 75 may be a structure separate from the fluid containing interior portion of pile 10.

The thicker wall of pile 10 also provides for sacrificial corrosion allowance for soil. This may be a factor depending on the soil pH, soil type, or other characteristics of the install site. The thicker wall of pile 10 may afford a useful life of 30-50 years, or even a longer duration of use. Thin wall structures are subject to corrosion, holes, leaking, and lower heat transfer without allowing higher installation torque for soil densification.

Pile 10 may be installed without complex drilling equipment that may tear up the ground surface at the install site. Thick-walled pile 10 allows faster install without the necessity for a pre-drilled hole. Most soils require pre-drilled holes for thin wall and use which does not provide the dual benefits of soil densification and a faster install. High quality pipe is generally required to obtain a high torque install without unacceptable bending of the pipe material. Fast installation with elimination of install problems is an important factor for various embodiments of piles 10.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the tech-

REFERENCE NUMERALS

| |
|---|
| vertical pile member 10 |
| first end 15 |
| second end 20 |
| sidewall 25 |
| central insulated tube 30 |
| central uninsulated tube 30A |
| first opening 35 |
| second opening 40 |
| input pipe 45 |
| output pipe 50 |
| cap plate 55 |
| structural load 60 |
| sealed portion 65 |
| fluid 70 |
| warm (in) fluid 70A |
| cool (out) fluid 70B |
| lower bearing plate 75 |

What is claimed is:

1. A foundation system for providing support to a structural load thereon, and the foundation system for providing geothermal heat exchange using a fluid, the foundation system comprising:

at least one vertical pile member, the vertical pile member having a first end and a second end in opposition to one another, the first end configured to install in a distal location from a ground surface into a ground soil environment, the second end configured to install proximal to the ground surface, and a sidewall extending between the first end and the second end;

a central insulated tube extending in a longitudinal direction within the vertical pile member, the central insulated tube having a first opening and a second opening, the first opening configured adjacent the first end, the second opening configured adjacent the second end, and the central insulated tube configured to transmit a geothermal heat exchange fluid therein;

an input pipe and an output pipe configured to transmit the geothermal heat exchange fluid through the vertical pile member; and a closed end provided at the first end of the vertical pile member, the closed end configured to provide an area of densified soil in the ground soil environment adjacent the vertical pile member, and the area of densified soil configured to increase heat transfer capability between the vertical pile member and the ground soil environment through the sidewall between the first end and the second end;

wherein each of the central insulated tube and the closed end providing the area of densified soil adjacent to the pile member together provide a continuous area of heat exchange along the sidewall extending between (1) a first area of the sidewall adjacent the first opening of the central tube and (2) a second area of the sidewall adjacent to the second end of the vertical pile member; and wherein the central insulated tube is configured to limit heat exchange of the geothermal heat exchange fluid to the sidewall of the vertical pile member and prevent heat exchange from (1) the geothermal heat exchange fluid contained therein between the first opening and the second opening to (2) heat exchange fluid adjacent the second end of the vertical pile member between the sidewall and the central insulated tube.

2. The foundation system of claim 1, wherein the closed end has a pitch relative to a longitudinal axis of the vertical pile member so as to densify soil along an area adjacent the sidewall as the vertical pile member is driven into the ground.

3. The foundation system of claim 1, further comprising a cap plate configured to engage the vertical pile member at the second end thereof, and the cap plate configured to support a structural load thereon.

4. The foundation system of claim 3, wherein the cap plate is directly attached to each of the sidewall and the structural load supported thereon.

5. The foundation system of claim 3, wherein the structural load is a platform carrying machinery, a building, or at least one solar panel.

6. The foundation system of claim 1, wherein the structural load includes a thermal mass operably engaged with the vertical pile member for geothermal heat exchange from the ground soil environment to regulate temperature thereof, and the structural load receives support relative to the ground surface.

7. The foundation system of claim 1, wherein the second end is configured to install above the ground surface of a ground soil environment.

8. The foundation system of claim 1, wherein the second end is configured to install adjacent the ground surface of the ground soil environment.

9. The foundation system of claim 1, wherein the second end is configured to install below the ground surface of the ground soil environment.

10. The foundation system of claim 1, wherein the central insulated tube extends from a sealed portion adjacent the second end of the vertical pile member, with the first opening of the central insulated tube configured distal of the sealed portion and toward the first end of the vertical pile member, and the second opening of the central insulated tube configured to communicate at a location proximal to the sealed portion.

11. The foundation system of claim 1, wherein the input pipe is configured for fluid communication of the geothermal heat exchange fluid into the first opening of the central insulated tube.

12. The foundation system of claim 11, the output pipe is configured for fluid communication of the geothermal heat exchange fluid from between the sidewall and the central insulated tube adjacent the first end of the vertical pile member.

13. The foundation system of claim 1, wherein each of the input pipe and the output pipe are configured to extend through the sidewall of the vertical pile member at a location distal from the cap plate.

14. The foundation system of claim 1, wherein the sidewall has a thickness configured to support the structural load and transmit heat therethrough.

15. The foundation system of claim 1, wherein the sidewall is configured to transmit heat from a warmer one of the geothermal heat exchange fluid and the ground soil environment to a colder one of the geothermal heat exchange fluid and the ground soil environment.

16. The foundation system of claim 15, wherein the geothermal heat exchange fluid is the warmer one so as to allow the sidewall to transmit heat from the geothermal heat exchange fluid into the ground soil environment, and the central insulated tube is configured to prevent heat therein adjacent the second end from directly transmitting into the geothermal heat exchange fluid between the sidewall and the central insulated tube at the second end.

17. The foundation system of claim 16, wherein the structural load operably incudes a geothermal heat exchanger configured to transmit heat from at least a portion associated with the structural load into the geothermal heat exchange fluid.

18. The foundation system of claim 15, wherein the geothermal heat exchange fluid is the colder one so as to allow the sidewall to transmit heat from the ground soil environment into the geothermal heat exchange fluid, and the central insulated tube is configured to prevent heat from directly transmitting into the geothermal heat exchange fluid therein from the geothermal heat exchange fluid between the sidewall and the central insulated tube at the second end.

19. The foundation system of claim 18, wherein the structural load operably includes a geothermal heat exchanger configured to transmit heat from the geothermal heat exchange fluid into a portion associated with the structural load.

20. The foundation system of claim 18, wherein a plurality is provided of the at least one vertical pile member, the plurality is configured to support the structural load thereon, and the plurality is configured to provide geothermal heat exchange into the ground environment.

21. A vertical pile for providing support, and the vertical pile for providing geothermal heat exchange, the vertical pile comprising:
a first end and a second end in opposition to one another, the first end configured to install in a distal location from a ground surface into a ground soil environment, the second end configured to install proximal to the ground surface, and a sidewall extending between the first end and the second end;
a central insulated tube extending in a longitudinal direction within the vertical pile member, the central insulated tube having a first opening and a second opening, the first opening configured adjacent the first end, the second opening configured adjacent the second end, and the central insulated tube configured to transmit a geothermal heat exchange fluid therein;
an input pipe and an output pipe configured to transmit the geothermal heat exchange fluid through the vertical pile member; and
a closed end provided at the first end thereof, the closed end configured to provide an area of densified soil in the ground soil environment, and the area of densified soil configured to increase heat transfer capability between the sidewall and the ground soil environment through the sidewall between the first and and the second end;
wherein each of the central insulated tube and the closed end providing the area of densified soil together provide a continuous area of heat exchange along the sidewall extending between (1) a first area of the sidewall adjacent the first opening of the central tube and (2) a second area of the sidewall adjacent to the second end of the vertical pile member with optimized heat transfer capability and efficiency due to the combination of the densified soil together with the heat exchange limited by the central insulated tube; and
wherein the central insulated tube is configured to limit heat exchange of the geothermal heat exchange fluid to the sidewall of the vertical pile member and prevent heat exchange from (1) the geothermal heat exchange fluid contained therein between the first opening and the second opening to (2) heat exchange fluid adjacent the second end of the vertical pile member between the sidewall and the central insulated tube.

22. The vertical pile of claim 21, further comprising a cap plate configured to directly engage the vertical pile member at the second end thereof, and the cap plate configured to directly support a structural load thereon.

* * * * *